United States Patent Office 3,640,968
Patented Feb. 8, 1972

3,640,968
CURABLE DIVINYL ACETAL COPOLYMERS
Maurice A. Raymond, Northford, Conn., assignor to Olin Corporation
No Drawing. Filed Feb. 11, 1970, Ser. No. 10,590
Int. Cl. C08f 15/40; C08g 22/00
U.S. Cl. 260—77.5 R      11 Claims

ABSTRACT OF THE DISCLOSURE

This invention relates to new copolymers of selected divinyl acetals and selected comonomers containing both a vinyl type unsaturation and an oxirane group. These copolymers have high tensile strength, high elongation and good adhesive properties and have utility as primers, adhesive and coatings for glass, plastics and metal.

This invention relates to new copolymers which are the copolymerization products of (a) divinyl acetal of the formula:

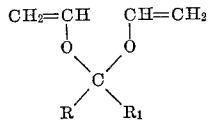

where R is hydrogen or alkyl and $R_1$ is hydrogen, alkyl or aryl, and (b) selected comonomers containing a vinyl type unsaturation and an oxirane group.

Homopolymers of divinyl acetals are well known, as for example shown in U.S. 3,285,969 and Matsoyan et al., Chemical Abstracts, 56, 1962, 7498g-i. However, these homopolymers are generally characterized by their poor tensile strength and elongation. Copolymers of divinyl acetal with ethylene, prepared as shown in U.S. 2,374,078 and 2,396,785, generally have overcome these undesired properties, i.e. they have high tensile strength and elongation. However, such copolymers generally are characterized as having low solubility thus making them unsuitable for many uses.

Now it has been found that the copolymers of this invention, having as little as 0.1 percent of selected comonomers incorporated therein, have very desirable properties as an adhesive. These new copolymers while having high tensile strength, high elongation and extremely good adhesive properties are particularly useful because they have sufficient solubility to allow easy application and additionally can be subsequently cured to give an insoluble polymer.

The copolymers of this invention have particular utility as primers, adhesive and coatings for glass, plastics and metal.

Broadly stated, the copolymers of this invention may be prepared by polymerization of selected divinyl acetals with selected comonomers, containing both a vinyl type unsaturation and an oxirane group, in the presence of a free radical type catalyst. This polymerization may be illustrated by the following equation wherein divinyl butyral is polymerized with glycidyl methacrylate in the presence of azobisisobutyronitrile (AZB):

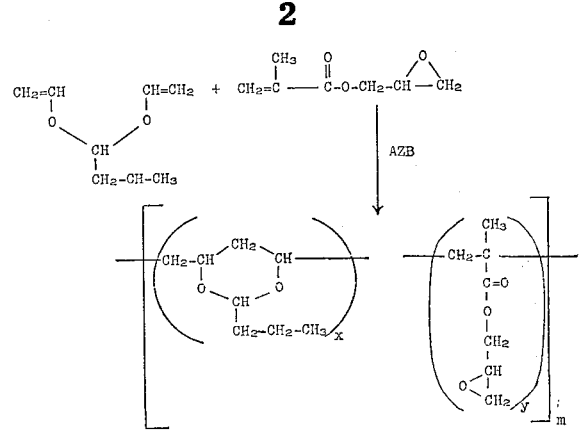

where x, y and m indicate a number of repeating integers. It is further noted that the above copolymer has a random distribution.

The divinyl acetals which may be used as starting material may be any defined by the formula:

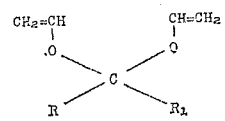

where R is hydrogen or alkyl and more particularly alkyl of 1 to 4 carbon atoms such as methyl, ethyl or butyl; $R_1$ is hydrogen, alkyl and more particularly alkyl of 1 to 4 carbon atoms such as methyl, ethyl and butyl, and aryl and more particularly aryl or substituted aryl of 6 to 10 carbon atoms such as phenyl, tolyl, xylyl, mesityl and naphthyl. Exemplary of some of the divinyl acetals represented by the above formula are divinyl formal, divinyl propional divinyl butyral, divinyl isobutyral, divinyl benzal and divinyl methyl benzal. These divinyl acetals may be prepared by any of the known methods such as the method shown in U.S. Pat. 3,463,823. While any of the divinyl acetals illustrated by the above formula may be used to prepare the copolymers of this invention, the particularly preferred divinyl acetal is divinyl butyral.

The selected comonomers which may be used to prepare the copolymers of this invention may be any monomer containing both a vinyl type unsaturation, i.e. a vinyl group or polymerizable double bond, and an oxirane group. More particularly, the comonomers which may be used are defined by the following formula:

$$C=C-(CH_2)_m-R_3-(CH_2)_n-CH_2-CH_2$$
         $|$
         $R_2$                              $O$ where $R_2$ is hydrogen or alkyl and more particularly alkyl of 1 to 4 carbon atoms; $R_3$ is a divalent moiety such as —O—,

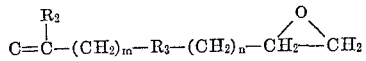

alkylene and more particularly alkylene of 1 to 4 carbon atoms, arylene and more particularly arylene of 6 to 10 carbon atoms, and a carbamate

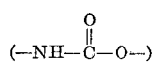

and $m$ and $n$ are integers, preferably from 0 to 4.

Illustrative of the comonomers which may be used are the following: glycidyl acrylate, glycidyl methacrylate, allyl glycidyl ether, vinyl glycidyl ether, methallyl glycidyl ether, isopropenyl glycidyl ether, p-glycidoxy styrene, p-glycidyl styrene, N-vinyl glycidyl carbamate and N-allyl glycidyl crabamate.

The catalyst used may be any of the known free radical type catalysts such as azobisisobutyronitrile, benzoyl peroxide, lauryl peroxide, methyl ethyl ketone peroxide, a redox system such as sodium sulfate and potassium or sodium persulfate, low temperature free radical catalysts such as trialkyl boron and oxygen, isobutyl peroxide and isobutyl peroxydicarbamate.

Generally any of the solvents which are well known for their use in the type polymerization system selected may be used. More particularly preferred solvents are relatively free radical inactive solvents such as benzene, hexane, toluene, tetrahydrofuran, petroleum spirits and reactive solvents such as chloroform and carbon tetrachloride which can be used to aid in molecular weight control.

The polymerization may be effected by any of the known polymerization techniques, such as in bulk, in solution or by the suspension or emulsion technique as, for example, shown in copending application Ser. No. 620,662 now U.S. Pat. No. 3,514,435.

Generally, the copolymers of this invention will have the desired properties of high tensile strength, high elongation and good adhesiveness and particularly will have the desired solubility when amounts of 0.1 to 50% by weight of comonomer and from 50 to 99.9% by weight divinyl acetal are incorporated therein. However, the particularly preferred amounts are 1 to 20% by weight comonomer and 80 to 99% by weight divinyl acetal incorporated in the copolymer.

The comonomer concentration charged in the polymerization process generally may be from 0.1 to 50% by weight with the preferred range being 1 to 20% and the divinyl acetal concentration charged generally may be from 50 to 99.9% by weight with the preferred range being 80 to 99%.

The temperature used may vary widely with the preferred temperature being from about −80° to 150° C. and pressure may vary from atmospheric up to 10 atmospheres with atmospheric pressure being preferred. However, the most satisfactory temperature and pressure conditions will depend upon the polymerizing characteristics of the particular system being used.

The copolymer of this invention may be cured using any of the curing catalysts known in the art for curing epoxides such as amines, amides or anhydrides, for example, triethylenetetramine.

The preparation of the compounds (I) of this invention is illustrated in the following examples.

EXAMPLE I

A 500 ml. 3-necked flask equipped with stirrer, thermometer, reflux condenser, and argon inlet and outlet was charged with 95 g. divinyl butyral (DVB), 5 g. glycidyl methacrylate, 0.5 g. azobisisobutyronitrile and 100 cc. of benzene. It was purged with argon for one hour and then heated to reflux for 3 hours. The mixture was cooled and the polymer precipitated by pouring into methanol. The polymer was washed with methanol, the methanol decanted and the polymer transferred to a Teflon-coated pan and dried at 30° C./10–15 mm. for 96 hours.

Conversion of the amount charged to copolymer was 38%. The infra-red spectrum of the polymer showed the expected absorptions for a copolymer. Analysis for percent carbon indicated a copolymer containing 15% glycidyl methacrylate. The copolymer was completely soluble in benzene and when heated on a Fisher-Johns melting point apparatus was observed to melt and flow.

A 7.5 g. sample of the copolymer was dissolved in benzene and 0.1 g. of triethylenetetramine was added. The solution was brushed onto aluminum and polypropylene coupons and the benzene allowed to evaporate. The coupons were then clamped together and heated to 100° C. for one hour. Lap shear adhesion was then determined on an Instron according to ASTM D-1002-64. Adhesion of aluminum to aluminum was 602 p.s.i.; aluminum to polypropylene was 75 p.s.i. A "Scotch tape" test was performed as follows: Polypropylene panels were sprayed with a benzene solution of the curable divinyl butyral containing triethylenetetramine curing agent. The panels were air dried and then cured in an oven at 100° C. for one hour. After cooling to room temperature strips of Scotch tape were applied to the surface and then rapidly pulled off. Ten percent of the polymer was removed by the tape. The cured adhesive was no longer soluble in benzene and upon heating, it became rubbery but did not flow.

EXAMPLE II

The same procedure as used in Example I was followed with 99 g. of divinyl butyral and 1 g. of glycidyl methacrylate being used. Conversion to copolymer was 36%. Analysis for percent carbon indicated a copolymer containing less than 1% glycidyl methacrylate. Lap shear adhesion as described in Example I of aluminum to aluminum was 537 p.s.i. and aluminum to polypropylene was 90 p.s.i. at which value the substrate failed. The Scotch tape test as described in Example I showed excellent adhesive properties in that no polymer was removed.

EXAMPLE III

The same procedure as used in Example I was followed with 95 g. of divinyl butyral and 5 g. of glycidyl acrylate being used. Conversion to copolymer was 43%. Analysis for percent carbon indicated a copolymer containing 9% glycidyl acrylate. The Scotch tape test showed no polymer removal. At ambient temperature it took 28 days for the copolymer to gel (cure).

EXAMPLE IV

The same procedure as used in Example I was followed with 99 g. of divinyl butyral and 1 g. of glycidyl acrylate being used. Conversion to copolymer was 34%. Analysis for percent carbon indicated a copolymer containing 1% glycidyl acrylate. The Scotch tape test showed no polymer removal. At ambient temperature it took 30 days for the copolymer to gel (cure).

EXAMPLE V

The same procedure as used in Example I was followed with 90 g. divinyl butyral and 10 g. of allyl glycidyl ether being used. Conversion to copolymer was 23%. Analysis for percent carbon indicated a copolymer containing less than 1% allyl glycidyl ether. The Scotch tape test showed no polymer removal. At ambient temperature it took 35 days for the copolymer to gel (cure).

EXAMPLE VI

The same procedure as used in Example I was followed with 95 g. of divinyl butyral and 5 g. of allyl glycidyl ether being used. Conversion to copolymer was 36%. Analysis for percent carbon indicated a copolymer containing less than 1% allyl glycidyl ether. The Scotch tape test showed no polymer removal. At ambient temperature, it took 23 days for the copolymer to gel (cure).

EXAMPLE VII

The same procedure as used in Example I was followed with 99 g. of divinyl butyral and 1 g. of allyl glycidyl ether being used. Conversion to copolymer was 37%.

Analysis for percent carbon indicated a copolymer containing less than 1% allyl glycidyl ether. The Scotch tape test showed no polymer removal. At ambient temperature, it took 32 days for the copolyme rto gel (cure).

EXAMPLE VIII

The same procedure as used in Example I was followed with 99 g. of divinyl butyral and 1 g. of vinyl glycidyl ether being used. Conversion to copolymer was 32%. The Scotch tape test showed no polymer removal.

What is claimed is:

1. A curable random copolymer which contains (a) 50 to 99% by weight of divinyl acetal of the formula:

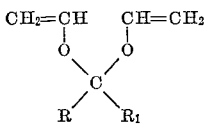

where R is selected from the group consisting of hydrogen and alkyl of 1 to 4 carbon atoms and $R_1$ is selected from the group consisting of hydrogen, alkyl of 1 to 4 carbon atoms and aryl of 6 to 10 carbon atoms and (b) 0.1 to 50% by weight of a comonomer of the formula:

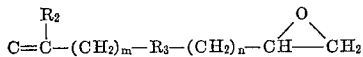

where $R_2$ is selected from the group consisting of hydrogen and alkyl of 1 to 4 carbon atoms; $R_3$ is selected from the group consisting of

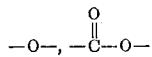

alkylene of 1 to 4 carbon atoms, arylenes of 6 to 10 carbon atoms and

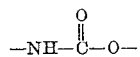

$m$ and $n$ are integers of 0 to 4.

2. The copolymer of claim 1, which contains 80 to 99% by weight of said divinyl acetal and 1 to 20% of said comonomer.

3. The copolymer of claim 1, wherein said divinyl acetal is divinyl butyral.

4. The copolymer of claim 1 wherein said comonomer is glycidyl methacrylate.

5. The copolymer of claim 1 wherein said divinyl acetal is divinyl butyral and said comonomer is glycidyl methacrylate.

6. The copolymer of claim 1 wherein said comonomer is glycidyl acrylate.

7. The copolymer of claim 1 wherein said divinyl acetal is divinyl butyral and said comonomer is glycidyl acrylate.

8. The copolymer of claim 1 wherein said comonomer is allyl glycidyl ether.

9. The copolymer of claim 1 wherein said divinyl acetal is divinyl butyral and said comonomer is allyl glycidyl ether.

10. The copolymer of claim 1 wherein said comonomer is vinyl glycidyl ether.

11. The copolymer of claim 1 wherein said divinyl acetal is divinyl butyral and said comonomer is vinyl glycidyl ether.

References Cited

UNITED STATES PATENTS

| | | | |
|---|---|---|---|
| 2,374,078 | 4/1945 | Coffner | 260—86 |
| 2,396,785 | 3/1946 | Hanford | 260—78 |
| 3,514,435 | 5/1970 | Ardis | 260—91.1 |

OTHER REFERENCES

C.A. 56 (1962), p. 7498G-i.
C.A. 55 (1961), p. 7900F.

JOSEPH L. SCHOFER, Primary Examiner

S. M. LEVIN, Assistant Examiner

U.S. Cl. X.R.

117—124 E, 132 RE, 188.8 UA; 161—216, 218, 252, 254; 260—80.3 E, 80.3 R, 86.1 R, 88.1 R, 91.1 R

PO-1050
(5/69)

UNITED STATES PATENT OFFICE
CERTIFICATE OF CORRECTION

Patent No. 3,640,968   Dated 2-8-72

Inventor(s) Maurice A. Raymond

It is certified that error appears in the above-identified patent and that said Letters Patent are hereby corrected as shown below:

Column 5, Claim 1, line 2, "99%" should read --99.9%--.

Signed and sealed this 8th day of May 1973.

(SEAL)
Attest:

EDWARD M.FLETCHER,JR.
Attesting Officer

ROBERT GOTTSCHALK
Commissioner of Patents